United States Patent [19]

Kashihara et al.

[11] Patent Number: 4,857,040
[45] Date of Patent: Aug. 15, 1989

[54] HIGH-SPEED CENTRIFUGAL EXTRACTOR HAVING IMPROVED WEIRS

[75] Inventors: Hidechiyo Kashihara, Mito; Shin-ichi Nemoto; Kazuhiro Ueno, both of Ibaraki, all of Japan

[73] Assignee: Doryokuro Kakunenryo Kaihatsu Jigyodan, Tokyo, Japan

[21] Appl. No.: 62,120

[22] Filed: Jun. 15, 1987

[30] Foreign Application Priority Data

Jun. 19, 1986 [JP] Japan .................................. 61-143530

[51] Int. Cl.⁴ .............................................. B04B 1/00
[52] U.S. Cl. ........................................ 494/22; 494/56; 494/60
[58] Field of Search ...................... 494/22, 43, 56–58, 494/60, 66; 210/360.1, 781

[56] References Cited

U.S. PATENT DOCUMENTS

| 1,712,184 | 5/1929 | Wendel | 494/57 |
| 2,394,016 | 2/1946 | Schutte et al. | 494/57 |
| 3,774,376 | 11/1973 | Takashima et al. | 494/60 X |
| 3,998,610 | 12/1976 | Leith | 494/22 |

Primary Examiner—Timothy F. Simone
Attorney, Agent, or Firm—Wenderoth, Lind & Ponack

[57] ABSTRACT

This invention is drawn to a high-speed centrifugal extractor having improved weirs for selectively separating a heavy liquid and a light liquid. Each of the selection weirs has a double tube structure consisting of an outer cylinder extending from a rotor peripheral wall towards a rotor rotary shaft and an inner cylinder which is inserted into the outer cylinder through the rotor peripheral wall in such a manner that the insertion length of the inner cylinder can be varied. The heavy liquid selection weir has a heavy liquid withdraw port at the wall of the outer cylinder positioned inside the heavy liquid phase, while the light liquid selection weir has a light liquid withdraw port at the wall of the outer cylinder positioned inside the light liquid phase. By varying the insertion length of the inner cylinder into the outer cylinder, the position of an interface at which the heavy and light liquid phases are separated inside a rotor can be changed.

3 Claims, 3 Drawing Sheets

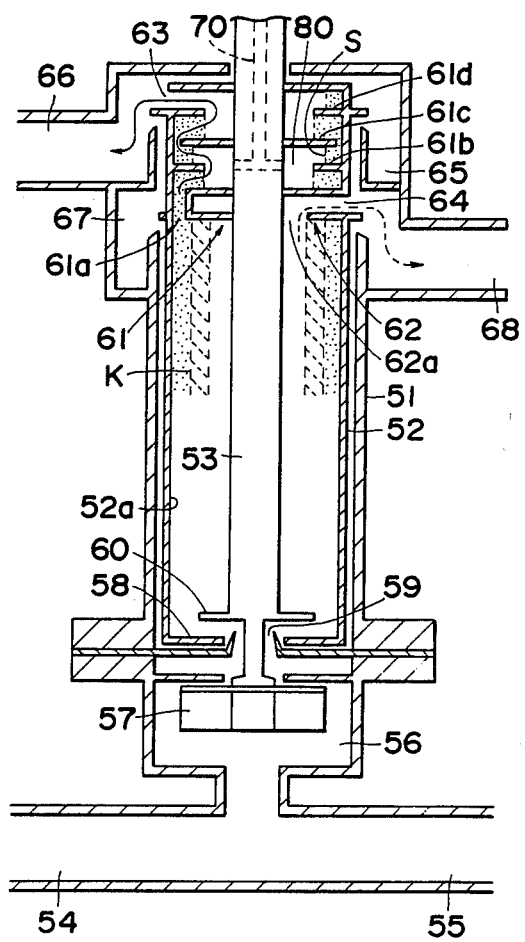
FIG. 5 - PRIOR ART

HIGH-SPEED CENTRIFUGAL EXTRACTOR HAVING IMPROVED WEIRS

BACKGROUND OF THE INVENTION

The present invention relates to a centrifugal extractor capable of rapidly performing liquid-liquid extraction by utilizing centrifugal force and, more particularly, to a high-speed centrifugal extractor equipped with improved weirs for facilitating selective extraction of heavy liquid and light liquid.

The high-speed centrifugal extractor is particularly suitable for separating uranium and plutonium contained in spent nuclear fuel from nuclear fission products when reprocessing the spent nuclear fuel by a solvent extraction method (such as a Purex process), but is not particularly limited to this field and can be applied widely to fields requiring liquid-liquid extraction of a heavy liquid and a light liquid.

A reprocessing method of spent nuclear fuel using the Purex process involves the steps of bringing a nitric acid solution (heavy liquid) containing uranium, plutonium and nuclear fission products into counter current flow contact with a tributyl phosphate (hereinafter called "TBP") diluted with hydrocarbon solution (light liquid) as an extraction solvent of uranium and plutonium in order to extract uranium and plutonium into the TBP from the nitric acid solution, then bringing the TBP once again into counter current flow contact with a new nitric acid solution in order to remove and wash the nuclear fission products that have been extracted in slight amounts into the TBP, and further bringing this washed TBP into counter current flow contact with a dilute nitric acid solution to cause a reverse extraction of the uranium and plutonium in the TBP into the dilute nitric acid solution.

Extractors such as a mixer-settler, a pulse column, and the like, have been used generally for the extraction, washing and reverse extraction processes described above. In the mixer-settler, however, a sufficient residence time must be secured because natural gravitational force acting on the liquids having different specific gravities is utilized in order to separate both liquids inside the extractor, and for this reason TBP as the extraction agent is likely to be damaged by radioactive rays. In the pulse column, on the other hand, it is known in the art that the dispersion state is deteriorated due to the wettability of the perforated plate fitted inside the column. These are the technical problems to be solved in order to obtain a high decontamination factor and a stable operating condition. In order to increase the processing capacity, a floor area must be increased in the mixer-settler while the diameter and height of the column must be increased in the pulse column. This means that the overall size of the extractors must be increased.

A high-speed centrifugal extractor has recently been developed as an extractor that solves the problems of the conventional extractor described above. The high-speed centrifugal extractor forcibly separates a mixture of the heavy liquid and light liquid into the heavy liquid and the light liquid by centrifugal force, and its typical construction is shown in FIG. 5 of the accompanying drawings. The high-speed centrifugal extractor fundamentally comprises a casing 51 and a cylindrical rotor 52 that is rotated at a high speed by a rotary shaft 53 inside the casing. The heavy liquid (such as a nitric acid solution) and a light liquid (such as TBP as an extraction agent) are supplied into a mixing chamber 56 at a lower part of the casing 51 from respective supply pipes 54 and 55. After they are sufficiently mixed inside the mixing chamber 56 by an impeller 57 disposed at the lower end of and rotating with the rotary shaft, the mixture is introduced into the rotor 52 from a center opening 59 of a rotor lower end plate 58. After the mixture is further stirred between the rotor end plate 58 and a baffle plate 60, the heavy liquid having a greater specific gravity is separated outwardly while the light liquid having a smaller specific gravity is separated inwardly of the heavy liquid due to the centrifugal force at the inner peripheral surface 52a of the rotor, and the liquids rise upwards along the rotor inner peripheral surface. Weirs 61, 62 for selectively extracting the liquids are disposed at the upper inside part of the rotor 52 to separately withdraw the heavy liquid and the light liquid through heavy and light liquid outlets 63 and 64, respectively. The heavy liquid selection weir 61 has a heavy liquid draw port 61a that opens outwardly of the interface K between the outer heavy liquid phase and the inner light liquid phase, that is, on the side of the heavy liquid phase. The heavy liquid passing through this port 61a overflows over a plurality of weir plates 61b, 61c, 61d, is then fed to the heavy liquid outlet 63 and is discharged through a heavy liquid discharge port 66 from a heavy liquid collection chamber 65 (as shown by the solid line arrow in the drawing). On the other hand, the light liquid selection weir 62 has a light liquid draw port 62a that opens inwardly of the interface K between the heavy liquid phase and the light liquid phase, that is, on the side of the light liquid phase, and the light liquid overflowing into this draw port 62a is introduced into a light liquid outlet 64, and is thence discharged through a light liquid discharge port 68 from a light liquid collection chamber 67 (as shown by the dotted line arrow in the drawing).

Since the high-speed centrifugal extractor forcibly separates the heavy liquid and the light liquid by centrifugal force as described above, it provides the following advantages.

(1) Since mixing is performed at a high-speed, the extraction efficiency is high.

(2) Since the contact time is extremely short, damage of the extraction agent by radioactive rays is minimal.

(3) Since the quantity of the liquid residing inside the extractor is small, the hold up quantity of nuclear substances and radioactive substances is small.

(4) The size of the extractor required in order to provide the same processing capacity as that of the conventional pulse column or mixer settler is extremely small.

(5) The time required before operation the operation equilibrium state is reached is short so that the time between the start and stop of processing is extremely short and also the quantity of resulting waste liquor is extremely small.

In the centrifugal extractor having the structure described above, the weirs 61, 62 for selecting the heavy liquid and the light liquid are fixed between the rotor inner peripheral plane 52a and the rotary shaft 53. On the other hand, the position of the interface K between the heavy liquid phase and the light liquid phase separated by the centrifugal force inside the rotor changes in accordance with the operating conditions, and for this reason, a charge in the position of the interface K must be suitably accomodated for with a change in the operating conditions in order to always obtain a high separation function of separating heavy liquid and light liquid by the weirs 61, 62 having a predetermined height.

In the conventional centrifugal extractor described above, compressed air that is pressure-fed from outside the extractor through a passage 70 inside the rotary shaft 53 is used as means for controlling the interface K. In other words, the compressed air is introduced, whenever necessary, into a sealed chamber 80 through the passage 70 to increase the air pressure inside the sealed chamber 80 and to control the interface K inside the rotor 52.

However, a complicated seal structure is necessary in order to reliably feed the compressed air without leakage through the rotary shaft 53, but the seal structure is likely to allow air leakage during a long period of use so that reliable control of the interface becomes impossible.

Furthermore, the structure of the selection weirs 61, 62 per se is complicated, too, because a plurality of weir plates 61b–61d are fixed to the rotary shaft 53 and the rotor inner peripheral plane 52 in such a manner as to project therefrom. Since they must be accurately balanced for allowing high speed revolution, a high level of skill is necessary for producing them.

SUMMARY OF THE INVENTION

A principal object of the present invention is to provide an improved high-speed centrifugal extractor which can eliminate the various problems of the conventional centrifugal extractors.

Another object of the present invention is to provide a high-speed centrifugal extractor which can select the position of the interface at which the heavy liquid phase and the light liquid phase are separated inside the rotor without pressure-feeding compressed air.

A further object of the present invention is to provide a high-speed centrifugal extractor having heavy liquid-light liquid selection weirs which are adjustable for controlling the position of the interface at which the heavy liquid phase and the light liquid phase are separated and that has a simple construction and can be produced easily.

According to the present invention, there is provided a high-speed centrifugal extractor of the type wherein an inlet for a mixed liquid comprising a heavy liquid and a light liquid is disposed at the bottom of a cylindrical rotor rotating at a high speed, a heavy liquid outlet and a light liquid outlet are disposed at the upper part of the rotor and a heavy liquid selection weir and a light liquid selection weir are disposed at the upper part inside the rotor in order to guide the heavy and light liquid phases separated inside the rotor by centrifugal force to the heavy and light liquid outlets, respectively, characterized in that each of the selection weirs comprises an outer cylinder which extends from a rotor peripheral wall toward a rotor rotary shaft and an inner cylinder which, with its ends being opened, extends through the rotor peripheral wall and is inserted into the outer cylinder so that the insertion length thereof can be varied. The heavy liquid selection weir has a heavy liquid withdraw port at the wall portion of the outer cylinder positioned inside the heavy liquid phase separated inside the rotor, and the light liquid selection weir has a light liquid withdraw port at the wall portion of the outer cylinder positioned inside the light liquid phase separated inside the rotor.

In the present invention, the liquid level inside the outer cylinder is changed when the insertion length of the inner cylinder into the outer cylinder is changed, and the position of the interface at which the outer heavy liquid phase and the inner light liquid phase are separated inside the rotor can be controlled freely by changing the liquid level inside the outer cylinder.

The apparatus of the present invention partly has a structure similar to the conventional centrifugal extractor in that a heavy liquid-light liquid mixture inlet is disposed at the bottom of a cylindrical rotor rotating at a high speed, a heavy liquid outlet and a light liquid outlet are disposed at the upper part of the rotor, and heavy liquid selection weir and a light liquid selection weir for guiding the heavy liquid phase and the light liquid phase, that are separated inside the rotor by centrifugal force, to the heavy and light liquid outlets, respectively, are disposed at the upper part inside the rotor.

An important feature of the present invention resides in the structure of the heavy and light liquid selection weirs.

Specifically each of these weirs has a so-called double tube structure consisting of an outer cylinder extending from the rotor peripheral wall towards the rotary shaft of the rotor and an inner cylinder which, with its ends being opened, is inserted into the outer cylinder through the rotor peripheral wall in such a manner that the insertion length can be varied. The heavy liquid selection weir has a heavy liquid withdraw port at the wall portion of the outer cylinder positioned inside the heavy liquid phase separated inside the rotor, while the light liquid selection weir has a light liquid withdraw port at the wall portion of the outer cylinder positioned inside the light liquid phase separated inside the rotor.

The mixture of the heavy liquid and the light liquid is introduced into the rotor at the bottom thereof and the heavy liquid is forced outwardly with the light liquid being separated inwardly of the heavy liquid due to the centrifugal force inside the rotor, and the liquids rise along the inner peripheral surface of the rotor while being rotated. The above-described operation is the same as that of the conventional centrifugal extractor.

In accordance with the present invention, however, the heavy liquid withdraw port of the outer cylinder of the heavy liquid selection weir, that is disposed at the upper part of the rotor, is open inside the outer heavy liquid phase. Therefore, a heavy liquid flows into the outer cylinder through this port, then overflows through the tip opening of the inner cylinder that is inserted a predetermined distance into the outer cylinder, then flows into the inner cylinder, and is guided to and discharged from the heavy liquid outlet. On the other hand, the light liquid flows into the outer cylinder through the light liquid withdraw port of the outer cylinder of the light liquid selection weir, then into the inner cylinder through the tip opening of the inner cylinder and is thereafter guided to, and discharged from, the light liquid outlet. Therefore, the liquid level inside the outer cylinder changes when the insertion length of the inner cylinder extending in the outer cylinder is changed, and the position of the interface K at which the outer heavy liquid phase and the inner light liquid phase are separated inside the rotor can be controlled freely.

These and other objects and novel features of the present invention will become more apparent from the following description when taken in conjunction with the accompanying drawings.

BRIEF DESCRIPTION OF THE DRAWINGS

FIG. 5 is a longitudinal sectional view showing a typical example of a conventional centrifugal extractor.

DETAILED DESCRIPTION OF THE PREFERRED EMBODIMENT

Hereinafter, the present invention will be described in further detail with reference to one preferred embodiment thereof shown in the accompanying drawings.

Figure 1:
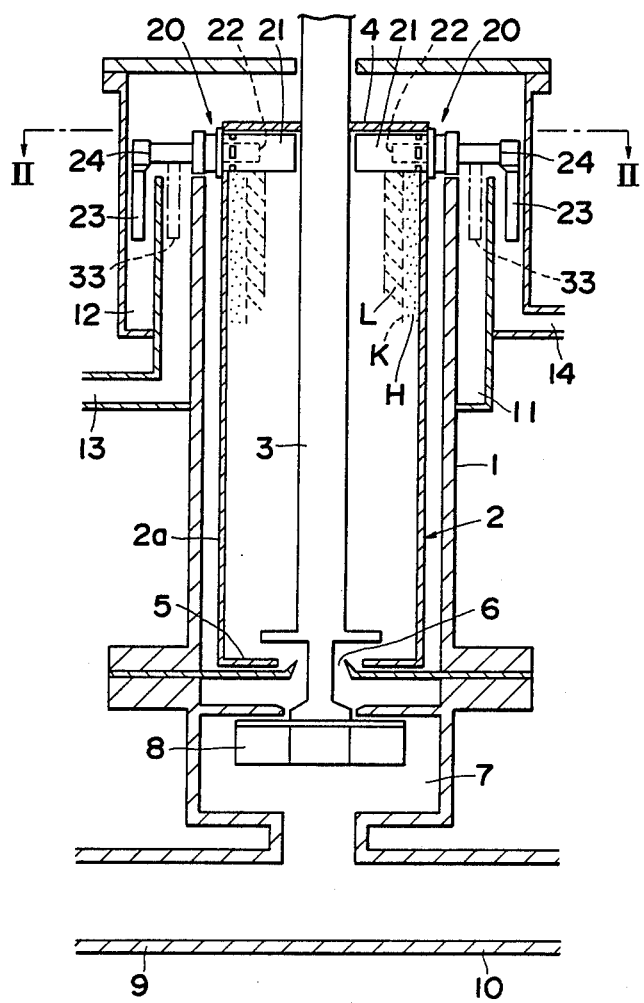
FIG. 1 is a longitudinal sectional view showing one embodiment of the present invention.

FIG. 1 shows the overall construction of the high-speed centrifugal extractor in accordance with the present invention. The extractor of the present invention consists fundamentally of a casing 1 and a cylindrical rotor 2 which is disposed coaxially with, and inside, the casing 1 and can rotate freely. A rotary shaft 3 driven to a high speed rotation by driving means (not shown) is disposed at the center of the rotor 2 and a rotor upper end plate 4 is fitted to the rotary shaft 3 so that the rotor 2 rotates together with the rotary shaft 3. The rotary shaft 3 extends into a mixing chamber 7 at the lower part of the casing 1 through a center opening 6 of a rotor lower end plate 5, and an impeller 8 is fitted to the lower end of this rotary shaft 3. The bottom of the casing 1 is connected to heavy and light liquid supply pipes 9 and 10, respectively, and an annular light liquid collection chamber 11 and a heavy liquid collection chamber 12 are disposed around the outer periphery of the upper part of the casing 1 and are connected to light liquid discharge port 13 and heavy liquid discharge port 14, respectively.

The construction described above is substantially the same as that of the conventional apparatus shown in FIG. 5. However, the apparatus of the present invention is different from the conventional apparatus in that heavy and light liquid selection weirs 20 and 30 each having a double tube structure are disposed below the rotor upper end plate 4.

Figure 2:
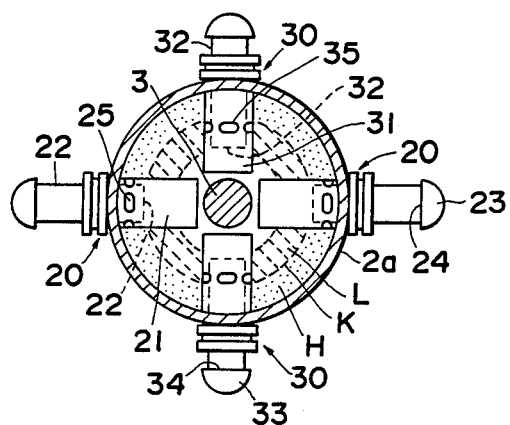
FIG. 2 is a sectional view taken along line II—II of FIG. 1.

As shown in FIGS. 1 and 2, each of the heavy and light liquid selection weirs 20 and 30 in the apparatus of the present invention has a double tube structure consisting of an outer cylinder 21, 31 that extends toward the rotor rotary shaft 3 from the rotor peripheral wall 2a and an inner cylinder 22, 32 that is inserted into the outer cylinder through the rotor peripheral wall. As can be seen in FIG. 2, two heavy and two light liquid weirs 20 and 30, or four weirs in total, are disposed equidistantly on the rotor peripheral wall 2a in the circumferential direction thereof in the embodiment shown in the drawings. In the sectional view of FIG. 1, only two weirs 20 for the heavy liquid are shown but it can be understood that two other weirs 30 for the light liquid are also disposed practically at right angle with respect to the weirs 20 as shown in FIG. 2. Incidentally, reference numeral 23 in FIG. 1 represents a conduit that is connected to one of the open ends of the inner cylinder 22 of each heavy liquid weir 20 and is suspended in the heavy liquid collection chamber 12. Likewise, a conduit 33 is fitted to one of the open ends of the inner cylinder 32 of each light liquid weir 30 (see FIG. 4), and this conduit 33 for the light liquid extends into, and is suspended in, the light liquid collection chamber 11 (as represented by the phantom lines in FIG. 1).

Figure 3:
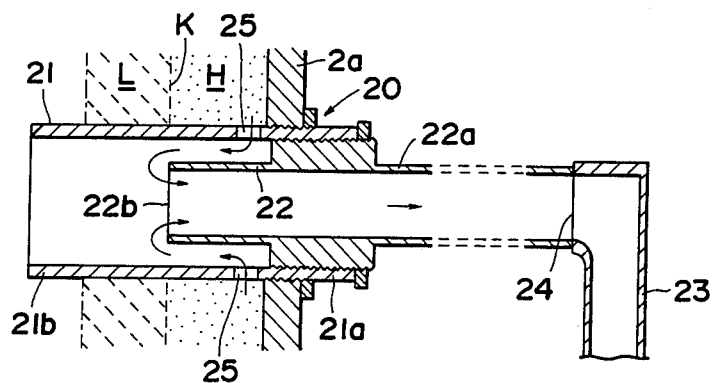
FIG. 3 is an enlarged longitudinal sectional view of a heavy liquid selection weir in the present invention.

The structure of the heavy liquid weir 20 will be described in further detail with reference to FIG. 3. The outer cylinder 21 comprises a pipe that extends from the rotor peripheral wall 2a toward of the rotor rotary shaft 3, while the inner cylinder 22 comprises a pipe having a smaller diameter with its ends being opened. The conduit 23 which is suspended in the heavy liquid collection chamber 12 is connected to the base end of the inner cylinder 22, that is, to the heavy liquid outlet 24. The base end 21a of the outer cylinder 21 is screwed to the rotor peripheral wall 2a as illustrated, and the inner cylinder 22 is inserted into the outer cylinder 21 in such a manner that the threads on the outer peripheral surface of the inner cylinder 22 mesh with the threads on the inner peripheral surface of the outer cylinder 21. This structure makes it possible to selectively change the distance that the inner cylinder 22 extends into the outer cylinder 21 by rotating the former.

The heavy liquid withdraw port 25 extends through the wall portion of the outer cylinder 21. This port 25 must be formed at a position at which it is open to the heavy liquid phase H separated inside the rotor. In the embodiment shown, the port 25 is formed near the rotor peripheral wall 2a.

The illustrated embodiment shows that the tip end 21b of the outer cylinder 21 is open, but it is possible to use a pipe whose tip end is closed. The light liquid weir 30 shown in FIG. 4 has a structure similar to that of the heavy liquid weir 20 shown in FIG. 3 except that a light liquid withdraw port 35 is provided. Namely, the light liquid withdraw port 35 formed on the outer cylinder 31 is open to the light liquid phase L which is separated from the heavy liquid phase H inside the rotor. The length of the inner cylinder portion 32a extending outward of the rotor peripheral wall 2a is smaller than the inner cylinder portion 22a of the heavy liquid weir 20, and a conduit 33 suspended into the light liquid collection chamber 11 is connected to the base end of the inner cylinder, that is, to the light liquid outlet 34.

Next, the operation of the high-speed centrifugal extractor having the construction described above will be explained. The heavy liquid (such as a nitric acid solution) and the light liquid (such as TBP as the extraction agent) are supplied to the mixing chamber 7 inside the casing 1 through the respecitve supply pipes 9 and 10, then mixed sufficiently by the impeller 8, and introduced into the rotor 2 through the center opening 6 of the rotor lower end plate 5. Of the mixed liquid thus introduced into the rotor, the heavy liquid accumulates at the outside while the light liquid accumulates at the inside due to the centrifugal force generated by the rotor, and the liquid rises along the rotor inner peripheral surface while being separated. As can be seen from FIG. 3, the heavy liquid phase H thus separated flows into the outer cylinder 21 from the heavy liquid withdraw port 25 of the outer cylinder 21 of the heavy liquid weir 20, then overflows into the tip opening 22b of the inner cylinder 22 so as to flow to the heavy liquid outlet 24 and thereafter is discharged from the heavy liquid discharge port 14 through the conduit 23 and the collection chamber 12. On the other hand, as can be seen from FIG. 4, the light liquid phase L flows into the outer cylinder 31 from the light liquid withdraw port 35 of the outer cylinder 31 of the light liquid weir 30, overflows into the tip opening 32b of the inner cylinder 32 so as to flow to the light liquid outlet 34 and thereafter is discharged from the light liquid outlet 13 through the conduit 33 and the collection chamber 11.

Figure 4:
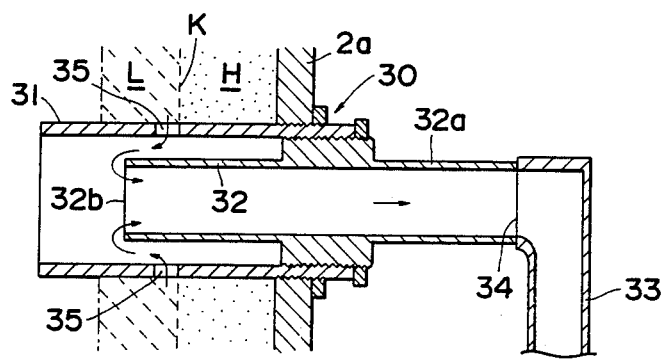
FIG. 4 is an enlarged longitudinal sectional view of a light liquid selection weir in the present invention.

As already described, the insertion length of each inner cylinder 22, 32 extending in the outer cylinder 21, 31 can be changed selectively by rotating the inner cylinder 22, 32 relative to the outer cylinder 21, 31. Therefore, when the insertion length of the inner cylinder 22 of the heavy liquid weir 20 is changed, the position of the interface K at which the heavy liquid phase H and the light liquid phase L are separated inside the rotor 2 can be changed. On the other hand, as shown in FIG. 4, when the insertion length of the inner cylinder 32 of the light liquid weir 30 is incresed so that the tip opening 32b of the inner cylinder 32 extends beyond the light liquid withdraw port 35 of the outer cylinder, it becomes possible to prevent the inflowing liquid from directly flowing into the inner cylinder 32 even when the light liquid which flows into the outer cylinder 31 from the light liquid withdraw port 35 is accompanied by the heavy liquid. In this case, the heavy liquid can be settled inside the outer cylinder 31 and only the light liquid is permitted to overflow from the tip opening 32b of the inner cylinder.

The structure of the high-speed centrifugal extractor shown in the drawings is merely for the purpose of illustrating the embodiment of the present invention. Accordingly, the present invention is not particularly limited to the embodiment described above. For example, the shape of the casing and the method of supplying the heavy and light liquids into the rotor need not be the same as those of the foregoing embodiment, and it should be understood by those skilled in the art that the structure of the heavy liquid-light liquid selection weirs as the characterizing feature of the present invention can be applied to all types of centrifugal extractors as long as they are of the type which separates the phases of the mixed solution of the heavy liquid and the light liquid supplied into the bottom of the cylindrical rotor, rotating at a high speed, by utilizing the centrifugal force.

In connection with the structure of the selection weirs, the outer cylinder and the inner cylinder need not consist of a pipe having a round cross section, but a cylinder member having a square cross section may be used. Alternatively, the outer cylinder may have a square cross section while the inner cylinder may consist of a pipe having a round cross section. Furthermore, the position and the number of selection weirs and the distance between them on the rotor peripheral wall in the circumferential direction can be suitably selected, whenever necessary.

As can be understood from the description given above, the heavy liquid-light liquid selection weir in the present invention has a double pipe structure consisting of the inner cylinder and the outer cylinder. Therefore, the structure is simpler and the production thereof is easier than the conventional structure wherein a plurality of weir plates are fixed to the rotor rotary shaft and to the rotor peripheral wall in such a manner as to project from them.

Furthermore, the position of an interface at which the heavy liquid and the light liquid phases are separated inside the rotor can be controlled extremely easily by merely changing the insertion length of the inner cylinder extending is outer cylinder. This structure eliminates the necessity of the complicated seal structure of the conventional apparatus for controlling the interface by use of compressed air as well as the unreliability of the interface control resulting from air leakage.

What is claimed is:

1. In a high speed centrifugal extractor for separating the liquid phases of a mixed liquid comprising a heavy liquid phase and a light liquid phase, and having a cylindrical rotor in which the liquid phases are separated including a peripheral wall disposed vertically so as to have a bottom and an upper part, a rotary shaft extending in and connected to said rotor for rotating said rotor at a high speed, an inlet disposed at the bottom of the rotor for introducing the mixed liquid into the rotor, a heavy liquid outlet and a light liquid outlet each disposed at the upper part of the rotor, a heavy liquid selection weir disposed within the rotor at the upper part thereof and in communication with the heavy liquid outlet for guiding the heavy liquid phase separated from the mixed liquid in the rotor to the heavy liquid outlet, and a light liquid selection weir disposed within the rotor at the upper part thereof and in communication with the light liquid outlet for guiding the light liquid phase separated from the mixed liquid in the rotor to the light liquid outlet, the improvement comprising:

each of said liquid selection weirs comprising an outer cylinder extending from the peripheral wall of the rotor toward the rotary shaft, and an inner cylinder having open ends and extending through the peripheral wall of the rotor and within said outer cylinder over an insertion distance, said inner cylinder being movable relative to the peripheral wall of the rotor for adjusting the insertion distance over which the inner cylinder extends in said outer cylinder, the heavy liquid selection weir having a heavy liquid withdraw port extending through the outer cylinder thereof adjacent the peripheral wall of the rotor for allowing the heavy liquid phase of the mixed liquid separated in the rotor to pass therethrough to the heavy liquid outlet, and the light liquid selection weir having a light liquid withdraw port extending through the outer cylinder thereof at a position spaced inwardly toward the rotary shaft with respect to the heavy liquid withdraw port for allowing the light liquid phase of the mixed liquid separated in the rotor to pass therethrough to the light liquid outlet.

2. An improvement in a high speed centrifugal extractor as claimed in claim 1, wherein each said outer cylinder has a base end including an external thread threaded to the peripheral wall of the rotor and an internal thread, and each said inner cylinder has an external thread meshing with the internal thread of a respective said outer cylinder, whereby the insertion distance is adjustable by rotating the inner cylinder relative to the outer cylinder in which said inner cylinder extends.

3. An improvement in a high speed centrifugal extractor as claimed in claim 1, wherein a plurality of said liquid selection weirs are disposed equidistantly apart from one another about the circumference of the peripheral wall of the cylindrical rotor.

* * * * *